US008630309B2

(12) United States Patent
Hong et al.

(10) Patent No.: US 8,630,309 B2
(45) Date of Patent: Jan. 14, 2014

(54) FRAME GENERATION APPARATUS AND METHOD OF PROTECTING PROTOCOL HEADER INFORMATION OVER WIDEBAND HIGH FREQUENCY WIRELESS SYSTEM

(75) Inventors: Seung Eun Hong, Daejeon (KR); Kyeongpyo Kim, Daejeon (KR); Yong Sun Kim, Suwon-si (KR); Hyoung Jin Kwon, Chungcheongbuk-do (KR); Woo Yong Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 666 days.

(21) Appl. No.: 12/556,958

(22) Filed: Sep. 10, 2009

(65) Prior Publication Data

US 2010/0061400 A1   Mar. 11, 2010

(30) Foreign Application Priority Data

Sep. 10, 2008 (KR) .................. 10-2008-0089425
Nov. 4, 2008 (KR) .................. 10-2008-0108867
Aug. 6, 2009 (KR) .................. 10-2009-0072334

(51) Int. Cl.
*H04J 3/16* (2006.01)
(52) U.S. Cl.
USPC ........................................................ 370/466
(58) Field of Classification Search
USPC ........................................................ 370/466
See application file for complete search history.

(56) References Cited

U.S. PATENT DOCUMENTS 6,643,469 B1   11/2003  Gfeller et al.
8,102,853 B2 *  1/2012  Ngo et al. ................. 370/392

| 2004/0258092 | A1* | 12/2004 | Sugaya ............... 370/474 |
| 2005/0185608 | A1* | 8/2005 | Lee et al. ............ 370/328 |
| 2006/0072615 | A1* | 4/2006 | Narad et al. ......... 370/474 |
| 2006/0153126 | A1* | 7/2006 | Jung et al. .......... 370/328 |
| 2007/0081532 | A1* | 4/2007 | Kim et al. ........... 370/389 |
| 2007/0253383 | A1* | 11/2007 | Yang ................. 370/338 |
| 2008/0225982 | A1* | 9/2008 | Chrabieh et al. ...... 375/299 |
| 2009/0092138 | A1* | 4/2009 | Joo et al. ........... 370/392 |

FOREIGN PATENT DOCUMENTS

| KR | 10-2001-0077300 | 8/2001 |
| KR | 10-2005-0082658 | 8/2005 |
| KR | 10-2007-0040597 | 4/2007 |
| KR | 10-2008-0044321 | 5/2008 |
| WO | WO 2007/146064 A2 | 12/2007 |

OTHER PUBLICATIONS

3GPP TS 36.321 V8.0.0 (Dec. 2007), 3rd Generation Partnership Project;Technical specification group radio access network;evolved universal terrestrial radio access (E-UTRA) (release 8),pp. 19-21.*
3GPP TS 36.321 V8.0.0 (Dec. 2007), release 8, Technical specification Group radio Access Network;entire document.*
Reed solomon code vs. Repetition in WiMedia UWB, Rabih Chrabieh and koorosh Akhavan,2007,entire document, Qualcomm.*

* cited by examiner

*Primary Examiner* — Mark Rinehart
*Assistant Examiner* — Maharishi Khirodhar
(74) *Attorney, Agent, or Firm* — Staas & Halsey LLP

(57) ABSTRACT

Provided are a frame generation apparatus and method that may protect variable length header information in a wideband high frequency wireless system. The frame generation apparatus may report variable length header information of a frame, and thereby the variable length header information may be verified in a receiving device. Also, the frame generation apparatus may convert a variable length header into a fixed length header by adding padding information to the variable length header of a frame, thereby protecting variable length header information.

13 Claims, 12 Drawing Sheets

FIG. 7

| bits:38-39 | 37 | 35-36 | 34 | 33 | 31-32 | 11-30 | 6-10 | 5 | 4 | 0-3 |
|---|---|---|---|---|---|---|---|---|---|---|
| Reserved | PCES | Pilot word length ID | Low latency mode | Beam tracking | Preamble type | Frame length or Number of subheaders | MCS | UEP | Aggregation | Scrambler seed ID |
| 612 | 630 | 629 | 628 | 627 | 626 | 715 | 624 | 623 | 622 | 621 |

| bits:38-47 | 37 | 36 | 35 | 34 | 33 | 31-32 | 11-30 | 6-10 | 5 | 4 | 0-3 |
|---|---|---|---|---|---|---|---|---|---|---|---|
| Reserved | Skewed constellation | PCES | Bit interleaver | Low latency mode | Beam tracking | Preamble type | Frame length or Number of subheaders | MCS | UEP | Aggregation | Scrambler seed ID |
| 812 | 822 | 630 | 821 | 628 | 627 | 626 | 915 | 624 | 623 | 622 | 621 |

910

FRAME GENERATION APPARATUS AND METHOD OF PROTECTING PROTOCOL HEADER INFORMATION OVER WIDEBAND HIGH FREQUENCY WIRELESS SYSTEM

CROSS-REFERENCE TO RELATED APPLICATIONS

This application claims the priority benefit of Korean Patent Application Nos. 10-2008-0089425 filed on Sep. 10, 2008, No. 10-2008-0108867 filed on Nov. 4, 2008, and No. 10-2009-0072334 filed on Aug. 6, 2009, in the Korean Intellectual Property Office, the disclosures of which are incorporated herein by reference.

BACKGROUND

1. Field of the Invention

Exemplary embodiments relate to a method for effectively protecting protocol header information in a system in which a high-speed transmission is performed using an ultra wideband frequency band, and more particularly, to a frame generation method that may protect header information having a variable length.

2. Description of the Related Art

A Reed-Solomon (RS) code is a Forward Error Correction (FEC) technique that may be widely used in various application fields such as mobile communications, magnetic storage, optical storing media, wired and satellite communications, and the like. An RS (255, 239) code or an RS (224, 216) code may be used in a 60 GHz Millimeter Wave (mmWave) wireless communication system.

In general, a shortened RS code scheme, that is, an RS code scheme may have 255-numbered information bytes or 224-numbered information bytes as a mother code, and may add 239-numbered bytes or 216-numbered bytes, having a value of '0', after the information byte. Using the information bytes in which the byte having the value of '0' is added, an RS parity bit having a bit length of 16×8 or 8×8 may be generated according to an RS FEC scheme, and the generated RS parity bit may be added after the information bytes. In this instance, the bytes having the value of '0', which are added after the information bytes, may be removed.

A shortened Low Density Parity Check (LDPC) code scheme, similar to the shortened RS code scheme, may be used in the 60 GHz mmWave wireless communication system. The shortened LDPC code scheme may have 672-numbered information bytes as a mother code, and add 336-numbered bytes, having a value of '0', after the information bytes. Using the information bytes in which the byte having the value of '0' is added, an LDPC parity bit may be generated according to the LDPC code scheme, and the generated LDPC parity bit may be added after the information bytes. In this instance, the bytes having the value of '0', which are added after the information bytes, may be removed.

A conventional Single Carrier (SC) physical layer protocol (PHY) standard may encode a PHY header, a Media Access Control (MAC) header, a Header Check Sequence (HCS) field using the above described shortened RS code scheme. In this instance, the PHY header, the MAC header, and the HCS field for error detection of the MAC header may designate a basic header of a frame (hereinafter, referred to as basic header"). An MAC subheader and the HCS field may be encoded using the shortened RS code scheme. In this instance, the HCS field for error detection of the MAC sub-header and another MAC subheader may designate a selection header of a frame (hereinafter, referred to as "selection header").

However, a conventional selection header in which the above described shortened RS code is used may have a variable length. Accordingly, the variable length may cause a problem in that an RS decoding of a selection header having the variable length may not be effectively performed in a receiving device. That is, when an encoding is performed using the shortened RS code scheme in a sending device, bits having a value of '0' may be added to match a mother code length in the receiving device, and then the RS decoding may be performed. However, when receiving the selection header having the variable length, a number of bits having the value of '0' that are required to be added is unknown.

In a conventional High Speed Internet (HSI) PHY standard, the basic header including the PHY header, the MAC header, and the HCS field may be encoded using the shortened LDPC code scheme in the same manner as that in the above described SC PHY standard. The conventional HSI PHY standard may encode a selection header including the MAC subheader and the HCS field using the shortened LDPC code scheme.

In the HSI PHY standard, similar to the above described SC PHY standard, the selection header may have a variable length. Accordingly, the variable length may cause a problem in that an LDPC decoding of the selection header having the variable length may not be effectively performed in a receiving device. That is, when an encoding is performed using the shortened LDPC code scheme in a sending device, bits having a value of '0' may be added to match a mother code length in the receiving device, and then the LDPC decoding may be performed. However, when receiving the selection header having the variable length, a number of bits having the value of '0' that are required to be added is unknown.

In a conventional Audio Video (AV) PHY standard, a High rate protocol (HRP) header, an extended MAC header, and the HCS field may be divided into two information byte blocks. The respective divided information byte blocks may be encoded using the shortened RS code scheme.

The extended MAC header may have a variable length since an MAC extension header field, a security header field, and a video header field may or may not exist in the extended MAC header. Nevertheless, in a conventional art, information including the HRP header, the extended MAC header, and the HCS may be considered to have a 92 byte fixed length, be divided into 48 bytes and 44 bytes, and then have the divided information blocks individually encoded using the shortened RS code scheme. Accordingly, when encoding/decoding a second information block having the variable length, an encoder and decoder may cause an error.

SUMMARY

An aspect of the present invention provides a frame generation apparatus and method for protecting variable length header information in a wideband high frequency wireless system.

Another aspect of the present invention also provides a method of dividing variable length protocol header information and data information.

Another aspect of the present invention also provides a frame generation method that may effectively divide protocol header information and data information in a receiving device to thereby perform a Reed-Solomon (RS) decoding or a Low Density Parity Check (LDPC) decoding on a variable length protocol header, although a shortened RS encoding or an LDPC encoding on the variable length protocol header is performed in a sending device.

According to an aspect of the present invention, there is provided a frame generation apparatus, including: a frame basic header generation unit to generate a basic header of a frame including a physical layer protocol (PHY) header, a Media Access Control (MAC) header, and a first Header Check Sequence (HCS).

According to another aspect of the present invention, there is provided a frame generation apparatus, including: a variable header generation unit to generate a variable length protocol header by receiving protocol header information; and a fixed header conversion unit to convert the variable length protocol header into a fixed length protocol header having a predetermined fixed length by adding a padding bits, having a value of '0', to the variable length protocol header, and to insert the converted protocol header in a frame.

According to still another aspect of the present invention, there is provided a frame generation method, including: generating a basic header of a frame including a PHY header, an MAC header, and a first HCS; and generating a selection header of a frame including a fixed length MAC subheader and a second HCS.

According to yet another aspect of the present invention, there is provided a frame generation method, including: generating a variable length protocol header by receiving protocol header information; and converting the variable length protocol header into a fixed length protocol header having a predetermined fixed length by adding a padding bits, having a value of '0', to the variable length protocol header, and inserting the converted protocol header in a frame.

EFFECT

According to embodiments of the present invention, there may be provided a frame generation apparatus that may report variable length header information of a frame. Accordingly, it is possible to verify a variable length header in a receiving device.

According to embodiments of the present invention, thereby may be also provided a frame generation apparatus that may convert a variable length header of a frame into a predetermined fixed length header by adding padding information to the variable length header. Accordingly, a receiving device may receive the predetermined fixed length header to remove the padding information, thereby verifying the variable length header.

BRIEF DESCRIPTION OF THE DRAWINGS

These and/or other aspects will become apparent and more readily appreciated from the following description of exemplary embodiments, taken in conjunction with the accompanying drawings of which:

FIG. 7 is a diagram illustrating another example of a configuration of an SC PHY header for variable length header information protection according to exemplary embodiments;

FIG. 9 is a diagram illustrating another example of a configuration of a HSI PHY header for variable length header information protection according to exemplary embodiments;

DETAILED DESCRIPTION

Figure 1:
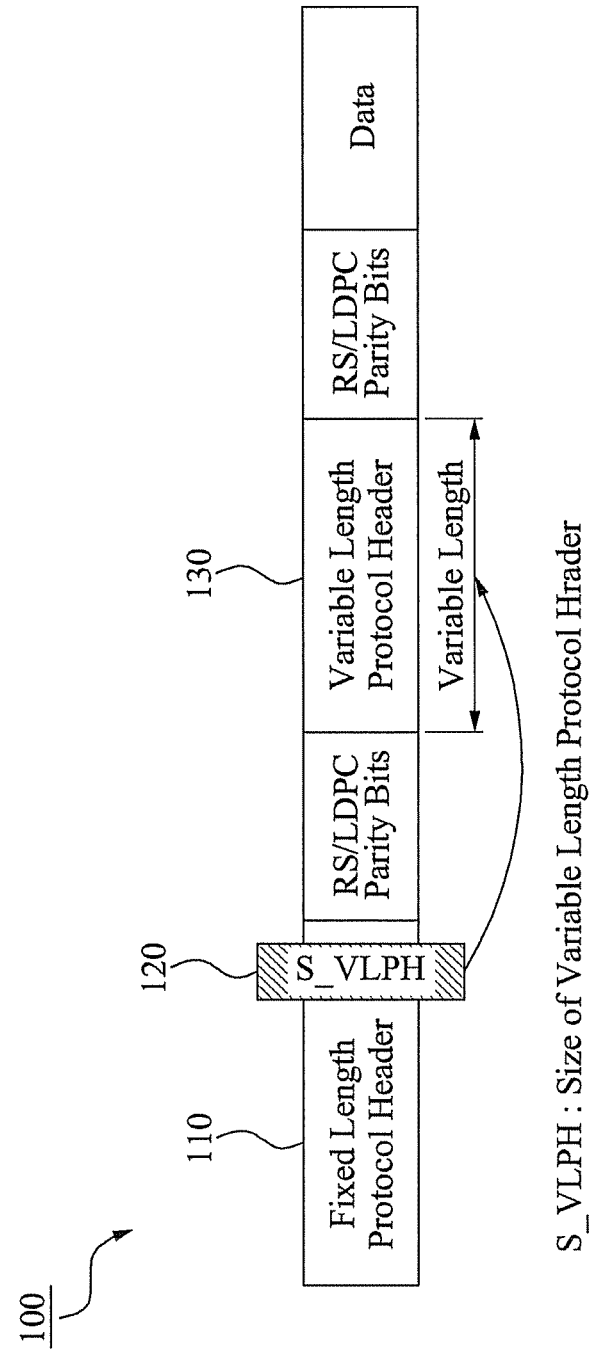
FIG. 1 is a diagram illustrating an example of a configuration of a frame for variable length header information protection according to exemplary embodiments.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, exemplary embodiments will be described in detail with reference to the accompanying drawings. When it is determined the detailed description related to a known function or configuration may render the purpose of the present invention unnecessarily ambiguous in describing the present invention, the detailed description will be omitted here.

Exemplary embodiments may be applied in a communication standard for high-speed data transmission. In this instance, as an example of the communication standard for high-speed data transmission, IEEE 802.15.3c may be given.

According to embodiments of the present invention, there are disclosed methods for dividing variable length header information and data information in a receiving device. First, there is disclosed a method for reporting variable length header information, and thereby a variable length header information may be verified in a receiving device. Second, there is disclosed a method for adding bits having a value of '0' to fit a mother code length, and encoding a mother code having the added bits using a Reed-Solomon (RS) code or a Low Density Parity Check (LDPC) code to thereby transmit the mother code while including bits having the value of '0'. Finally, there is provided a method of using a fixed length header as a most basic method.

The method for reporting variable length header information to verify a variable length header information in a receiving device will be described in detail.

FIG. 1 is a diagram illustrating an example of a configuration of a frame 100 for variable length header information protection according to exemplary embodiments. Referring to FIG. 1, a receiving device receiving the frame 100 may report a length of a variable length protocol header 130 using a length field (S_VLPH) 120. A sending device may divide a fixed length protocol header 110 and the variable length protocol header 130 to individually perform a shortened RS encoding or a shortened LDPC encoding. The sending device may permit the length field (S_VLPH) 120 of length information of the variable length protocol header 130 to be included in the fixed length protocol header 110 to construct the frame 100.

The receiving device may decode the fixed length protocol header 110 using the shortened RS decoding method or the shortened LDPC decoding method when receiving the frame 100. The receiving device may analyze the fixed length protocol header 110 to extract the length field (S_VLPH) 120 of length information of the variable length protocol header 130. In this instance, since the fixed length protocol header 120 has a fixed length, the receiving device may readily acquire a number of bytes or bits, each having a value of '0', intended to be added.

The receiving device may verify the length field (S-VLPH) 120, and decode the variable length protocol header 130 using the shortened RS decoding method or the shortened LDPC decoding method.

Figure 2:
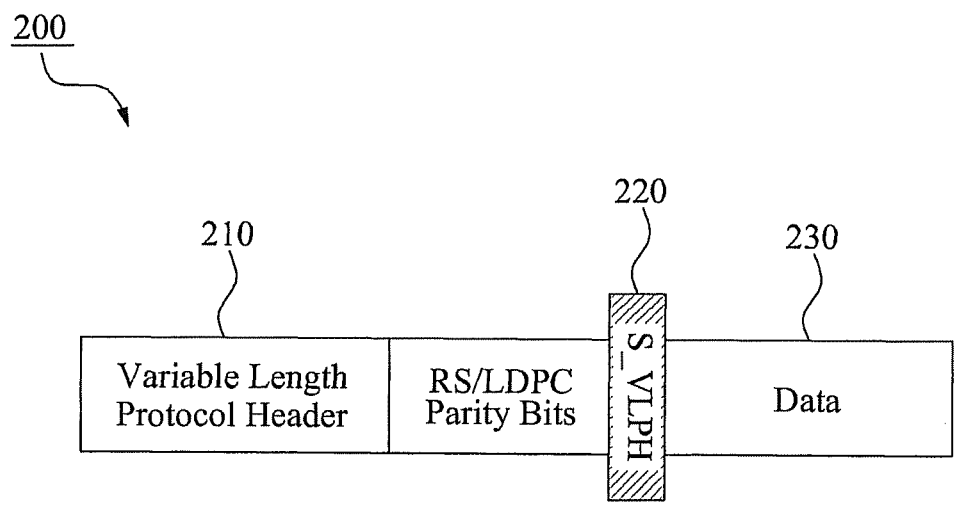
FIG. 2 is a diagram illustrating another example of a configuration of a frame for variable length header information protection according to exemplary embodiments.

FIG. 2 is a diagram illustrating another example of a configuration of a frame for variable length header information protection according to exemplary embodiments.

Referring to FIG. 2, the sending device may encode a variable length protocol header 210 using a shortened RS encoding method or a shortened LDPC encoding method, and insert, in a frame 200, a delimiter 220 of a physical signal so as to divide a boundary with data 230. The delimiter 220 may include signals having a specific pattern which is defined between the sending device and the receiving device in advance. The receiving device may verify that a reception of fixed length RS parity bit information or fixed length LDPC parity bit information and a reception of the variable length protocol header 210 are completed when detecting the delimiter 220 while receiving the frame 200. Accordingly, it is possible to extract a number of bits having a value of '0' to be added for the shortened RS decoding or the shortened LDPC decoding.

Figure 3:
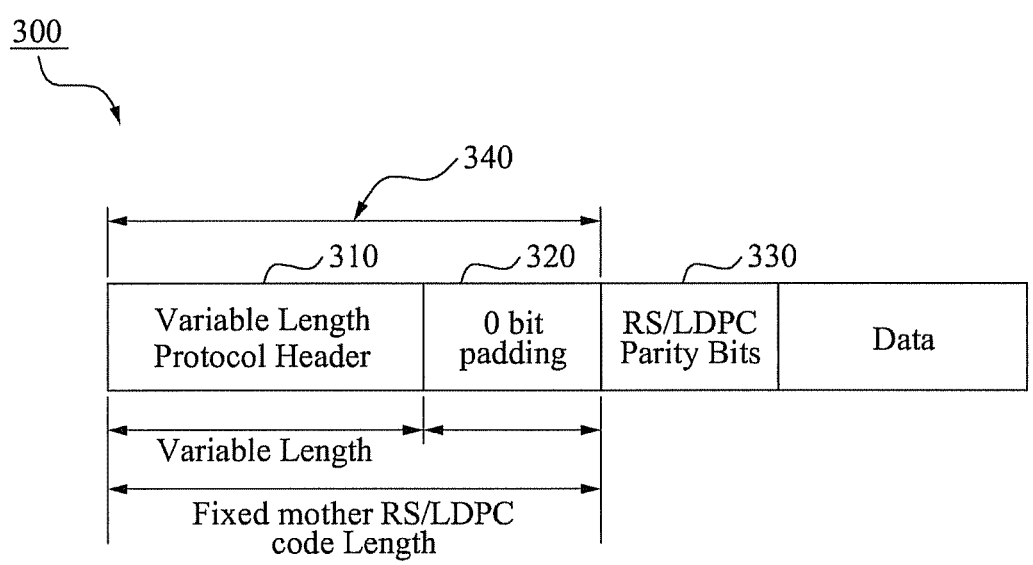
FIG. 3 is a diagram illustrating still another example of a configuration of a frame for variable length header information protection according to exemplary embodiments.

FIG. 3 is a diagram illustrating still another example of a configuration of a frame for variable length header information protection according to exemplary embodiments. Referring to FIG. 3, a sending device may add padding bits 320 having a value of '0' in a variable length protocol header 310 to generate a predetermined fixed length protocol header 340. The sending device may encode the predetermined fixed length protocol header 340 as a mother code using the shortened RS code or the shortened LDPC code.

That is, the sending device may generate a frame 300 including the predetermined fixed length protocol header 340.

A receiving device may verify that a reception of the protocol header 340 is completed when receiving a fixed length RS/LDPC parity bit 330. Then, the receiving device may perform an RS decoding or LDPC decoding. The padding bits 320 having a value of '0' may be an overhead. To reduce the overhead, a mode code having a shorter length may be used.

The protocol header information may be variable in a Single Carrier (SC) PHY standard and a High Speed Internet (HSI) PHY standard, when a data payload has an aggregated frame type. That is, at least one subframe may be bundled, and the bundled subframes may be encapsulated using a PHY/MAC header to thereby construct a frame. In this instance, the sending device may transmit the frame using a Modulation and Coding Scheme (MCS) which is different from each subframe, and the receiving device may receive the frame through the MCS applied for each subframe. To apply the MCS for each subframe, one subheader field may be applied per a subframe, and the subheaders are bundled to configure an MAC subheader. Accordingly, the MAC subheader may have a variable length depending on a number of aggregated subframes.

A method for encoding/decoding the MAC subheader using the shortened RS code or the shortened LDPC code by configuring the MAC subheader having the variable length to force the configured MAC subheader to have a fixed length will be described in detail with reference to FIGS. 4 and 5.

Figure 4:
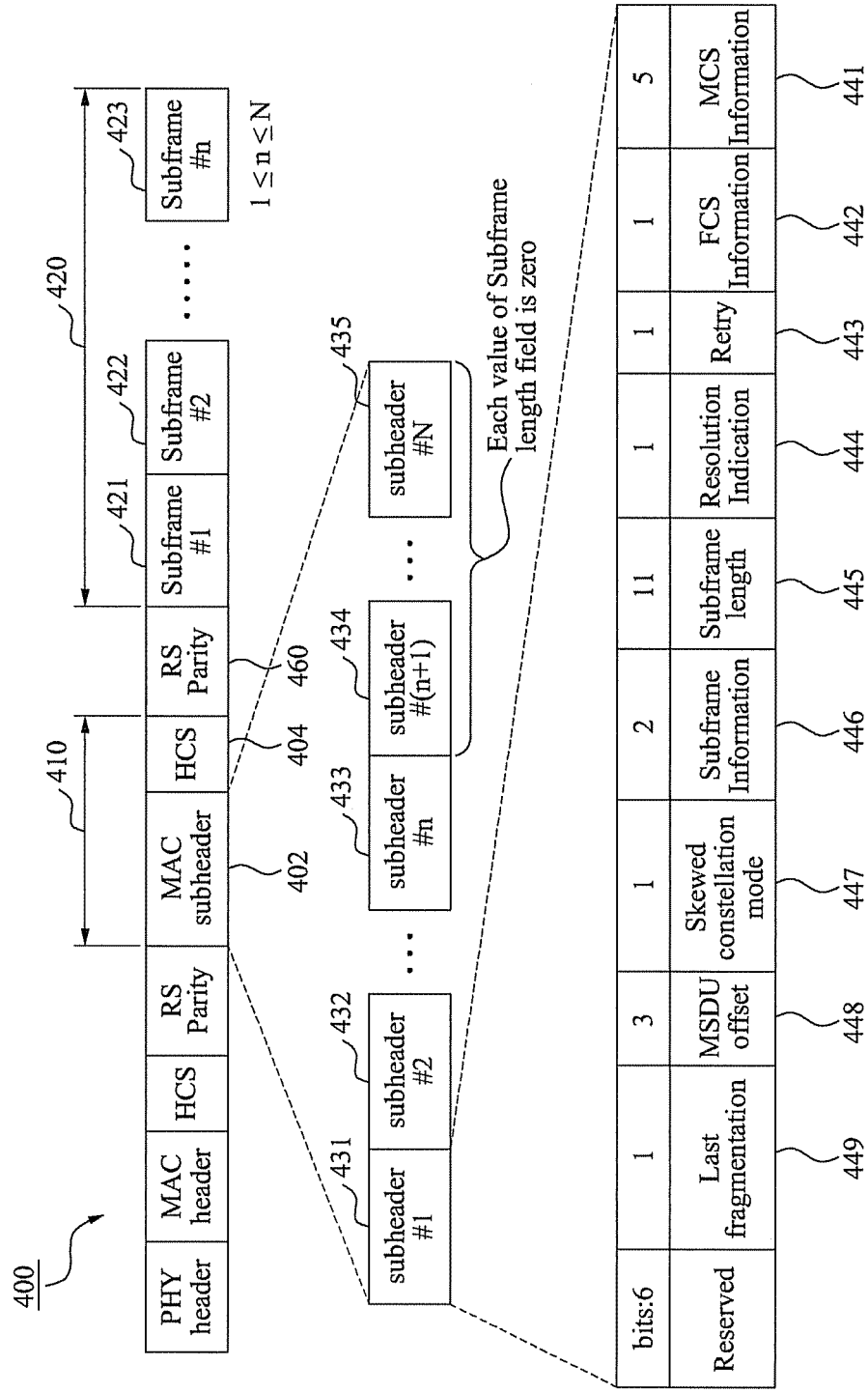
FIG. 4 is a diagram illustrating yet another example of a configuration of a frame for variable length header information protection according to exemplary embodiments.

FIG. 4 is a diagram illustrating yet another example of a configuration of a frame for variable length header information protection according to exemplary embodiments. Referring to FIG. 4, when transmitting an aggregated frame 400 according to an SC PHY standard, an MAC subheader 402 may be configured to have a fixed length, regardless of a number of the aggregated subframes. That is, the MAC subheader 402 may be configured to have the fixed length, and thereby a selection header 410 may be encoded/decoded using the shortened RS code.

A data payload 420 of the aggregated frame 400 may include at least one sub frame 421, 422, and 423. In this instance, a maximum number of subframes to be aggregated may be limited by the standard, and according to exemplary embodiments, the limited number may be 'N'. Accordingly, a number 'n' of the subframes configuring the data payload 420 of the aggregated frame 400 may be equal to or greater than '1', and equal to or smaller than 'N'.

Subheaders 431, 432, and 433 may have subframe information of each of the subframes 421, 422, and 423. The MAC subheader 402 including the subheaders 431, 432, and 433 may always include N subheaders 431, 432, 433, 434, and 435, regardless of a number 'n' of subframes included in the aggregated frame 400. Each value of subframe length fields from an (n+1)-th subheader 434 to an N-th subheader 435 may be zero. When a value of a subframe length field is zero based on a verified result of a subheader, the receiving device may determine the subheader to be a padding subframe, which does not exist in the aggregated frame 400.

Accordingly, the sending device may encode, using the shortened RS code, the selection header 410 including the MAC subheader 402 forcedly having a fixed length and a fixed length HCS 404, and insert an RS parity 460 in the frame. When receiving the aggregated frame 400, the receiving device may decode the aggregated frame 400 using the shortened RS code even without additional information about a length of the MAC subheader 402, since a predetermined determined length of the MAC subheader 402 is known.

Each field of the subheader 431 of FIG. 4 will be described hereinafter in detail.

An MCS information field 441 may be a field indicating a modulation and encoding scheme of the SC PHY and the HSI PHY used in each subframe. A Frame Check Sequence (FCS) information 442 may be a field indicating whether a frame check sequence is used. A retry field 443 may be a field indicating whether a re-transmission of a subframe is used. A subframe length field 445 may be a field indicating a length of a subframe, prior to encoding, which does not include the frame check sequence. A resolution indication field 444 may be a field indicating a unit of the subframe length field 445. A subframe information field 446 may be a field indicating a type of data included in a subframe. A skewed constellation mode field 447 may be a field indicating whether a skewed constellation scheme is used in a subframe. An MAC Service Data Unit (MSDU) offset field 448 may be a field indicating a difference value between a number of MSDUs of an MAC header and a number of MSDUs of a subframe. A last fragmentation field 449 may be a field indicating whether a current subframe is a last fragmentation of the MSDU.

Figure 5:
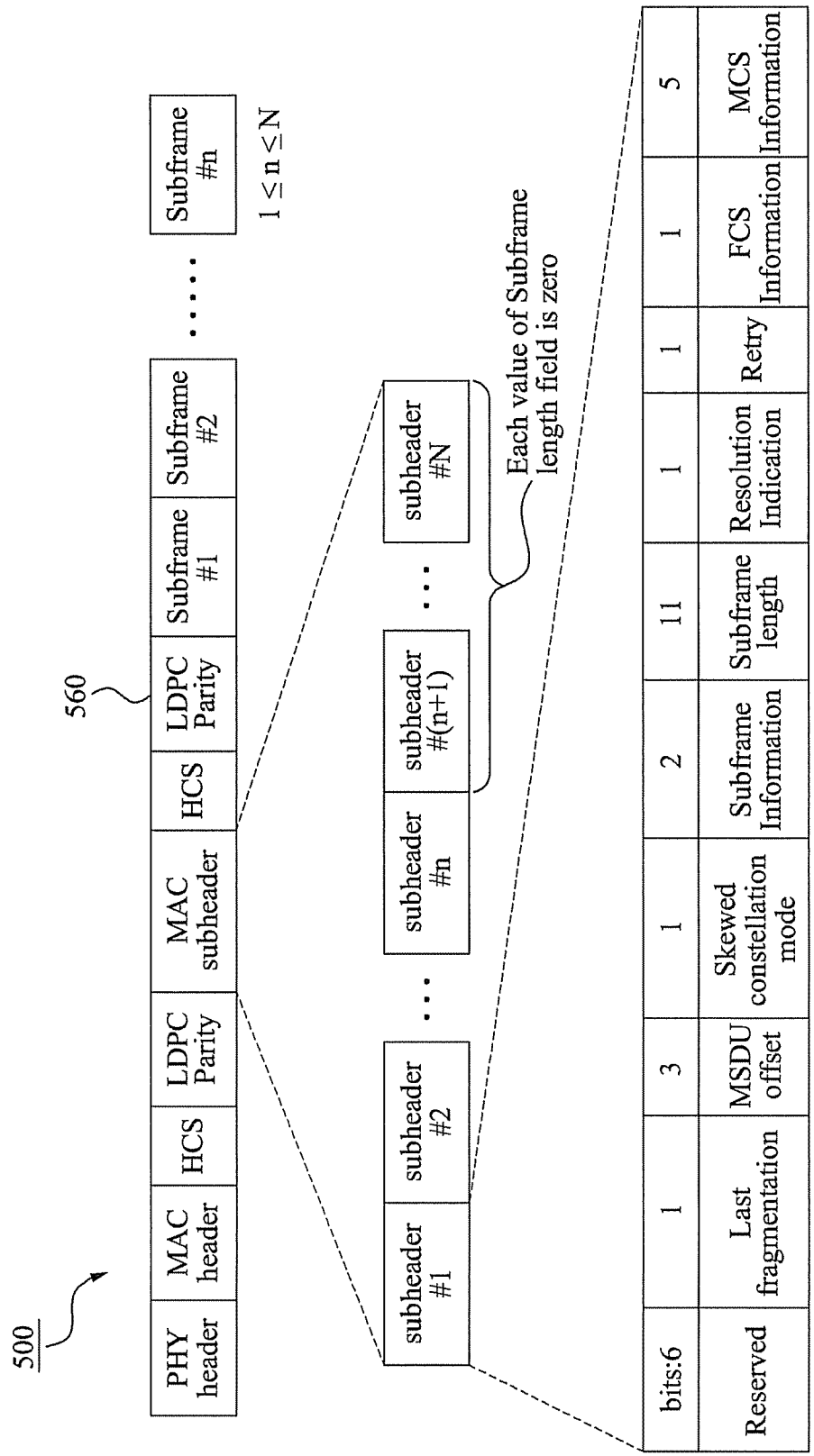
FIG. 5 is a diagram illustrating a further example of a configuration of a frame for variable length header information protection according to exemplary embodiments.

FIG. 5 is a diagram illustrating a further example of a configuration of a frame for variable length header information protection according to exemplary embodiments. Referring to FIG. 5, an MAC subheader may be configured to have a fixed length, and thereby the selection header 410 may be encoded/decoded using the shortened LDPC code. Descriptions of an aggregated frame 500 of FIG. 5 may be the same as those in FIG. 4, except that an encoded LDPC parity 560 is inserted using the shortened LDPC code.

To permit the MAC subheader 402 to forcedly have a fixed length in FIGS. 4 and 5, unnecessary subheaders 434 and 435 may be inserted. However, this may cause an overhead to be increased. To reduce the overhead, the method for reporting the variable header length using the length field, described in FIG. 1, may be more effective.

As described above, when transmitting the aggregated frame in the SC PHY standard and HSI PHY standard, the selection header including the MAC subheader may also have a variable length since the MAC subheader has the variable length. In this instance, to encode the MAC subheader using the shortened RS code or the shortened LDPC code, length information of the MAC subheader is required to be inserted in a basic header of a frame (hereinafter, referred to as "basic header") including a PHY header, an MAC header, and a HCS field. The length information of the MAC subheader may be indicated as subheader number information since a subheader configuring the MAC subheader has a fixed length. In this instance, when it is assumed that a maximum subframe number capable of being included in an aggregated frame is N, a number of bits of a field for indicating a number of the subheaders may be ceil (log 2(N+1)). Here, an operator of a ceil (a) may denote a minimum integer of integers equal to or greater than 'a'. For example, when N=8, a 4-bit space may be needed.

According to exemplary embodiments, a bit space for indicating MAC subheader length information may be referred to as a field of a number of subheaders. A length of the field of a number of subheaders may be a ceil (log 2(N+1)) bit having a fixed length. The field of a number of subheaders may be included in a PHY header or MAC header configuring the basic header. Since an existing PHY header and MAC header may also have a fixed length, a suggested basic header length while the field of a number of subheaders is added may have a fixed length. According to exemplary embodiments, the field of a number of subheaders may be added in the PHY header.

When transmitting an aggregated frame in the SC PHY standard or HSI PHY standard, exemplary embodiments in which the method for reporting the variable header length is applied will be described in detail with reference to FIGS. 6, 7, and 8.

Figure 6:
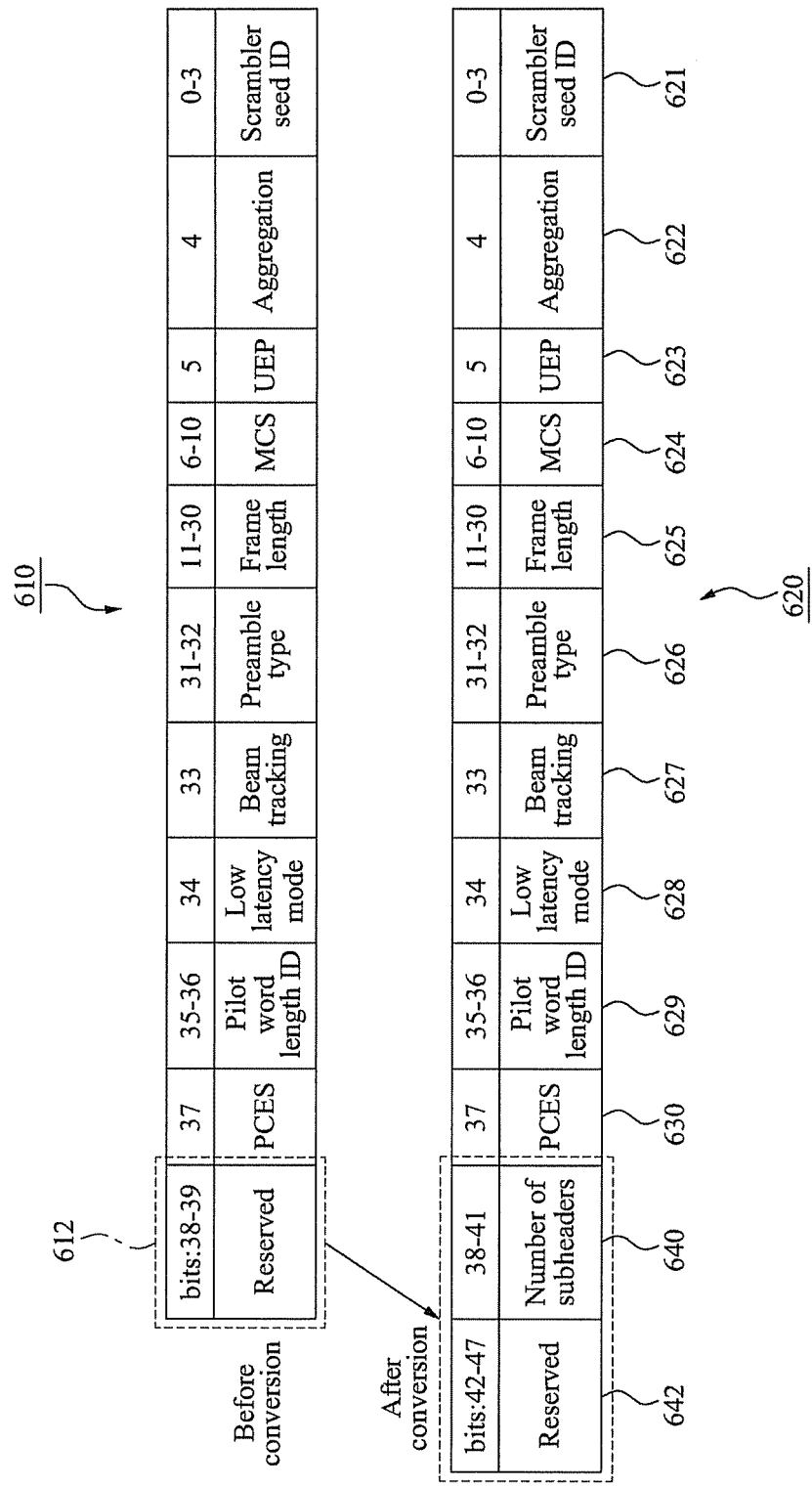
FIG. 6 is a diagram illustrating an example of a configuration of a Single Carrier (SC) physical layer protocol (PHY) header for variable length header information protection according to exemplary embodiments.

FIG. 6 is a diagram illustrating an example of a configuration of a Single Carrier (SC) physical layer protocol (PHY) header for variable length header information protection according to exemplary embodiments. Referring to FIG. 6, a field 640 of a number of subheaders may be added in an SC PHY header 620 of the SC PHY standard so as to report a variable length of a selection header of a frame (hereinafter, referred to as "selection header"). In this instance, when it is assumed that a maximum number of aggregated subframes is '8', a length of the field 640 of a number of subheaders is set as 4 bits. Also, a reserved field 642 may be set as a 6-bit space, whereby a length of the SC PHY header 620 may be changed to have a byte unit.

An existing SC PHY header 610 may include a reserved field 612 having 2 bits while not including the field 640 of a number of subheaders.

Each field of the SC PHY header 620 will be described hereinafter in detail. A scrambler seed identifier (ID) 621 may be a field storing a seed value of a scrambler. An aggregation field 622 may be a field indicating whether an aggregation scheme is used. An Unequal Error Protection (UEP) filed 623 may be a field indicating whether an unequal error protection scheme is used. An MCS field 624 may be a field indicating a modulation and encoding scheme of an SC PHY. A frame length field 625 may be a field indicating a length of an MAC frame excepting the frame check sequence as an octet unit. A preamble type field 626 may be a field indicating a type of a preamble intended to be used in a next frame. A beam tracking field 627 may be a field indicating whether a training sequence for beam tracking exists. A low latency mode field 628 may be a field indicating whether a low latency aggregation mode of a frame is used. A pilot word length ID field 629 may be a field indicating a length of a pilot word. A Pilot Channel Estimation Sequence (PCES) field 630 may be a field indicating whether a pilot channel estimation sequence is included.

When the aggregation field 622 of the SC PHY header 620 illustrated in FIG. 6 is zero, that is, when the selection header may not have a variable length, an added field 640 of a number of subheaders may be useless. Accordingly, the field 640 of a number of subheaders may act as an overhead.

According to exemplary embodiments, another configuration of the SC PHY header so as to reduce the overhead of the field 640 of a number of subheaders generated in FIG. 6 will be described in detail with reference to FIG. 7.

FIG. 7 is a diagram illustrating another example of a configuration of an SC PHY header for variable length header information protection according to exemplary embodiments. Referring to FIG. 7, the aggregation field 622 of an SC PHY header 710 may denote an aggregated frame, when being set as '1', and a variable length MAC subheader may be included in the aggregated frame. A subframe length field 445 indicating the subframe length described in FIG. 4 may be included in each subheader information configuring the MAC subheader. Accordingly, when the MAC subheader is included in each subheader, frame length information of the SC PHY header 710 may be unnecessary information. Thus, according to exemplary embodiments, an application of a field of a number of subheaders may be added in an existing frame length field, so that the existing frame length field may be used as a frame length field or a field 715 of a number of subheaders. That is, when a value of the aggregation field 622 is zero, the frame length or the field of a number of subheaders 715 is used as the frame length field, and when the value of the aggregation field 622 is '1', the frame length or the field of a number of subheaders 715 is used as the field of a number of subheaders.

Descriptions of identical fields to those of FIG. 6, from among each field of the SC PHY header 710 of FIG. 7, will be omitted.

Figure 8:
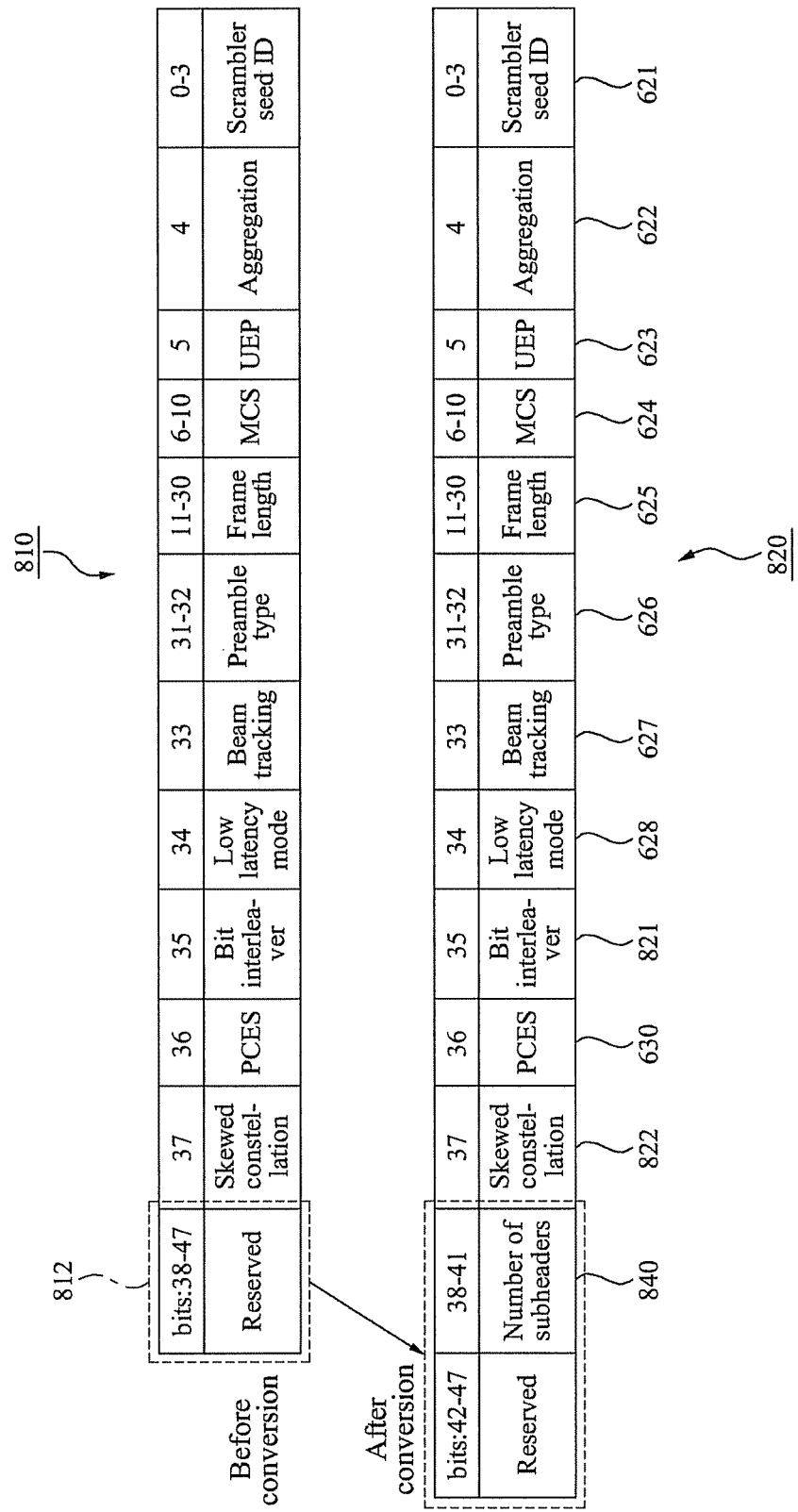
FIG. 8 is a diagram illustrating an example of a configuration of a High Speed Internet (HSI) PHY header for variable length header information protection according to exemplary embodiments.

In FIGS. 8 and 9, descriptions of FIGS. 6 and 7 may be applied in a structure of an HSI PHY header.

FIG. 8 is a diagram illustrating an example of a configuration of an HSI PHY header for variable length header information protection according to exemplary embodiments.

Referring to FIG. 8, an HSI PHY header 820 may use 4 bits of a reserved field 812 of an existing HSI PHY header 810 as a field of a number of subheaders 840.

Each field of the HSI PHY header 820 of FIG. 8 will be described hereinafter in detail. A bit interleaver field 821 may be a field indicating whether a bit interleaver is used in a payload of a frame. A skewed constellation field 822 may be a field indicating whether an unequal error protection constellation mapping scheme is used. Descriptions of identical fields to those of FIG. 6, from each field of the HSI PHY header 820, will be omitted.

FIG. 9 is a diagram illustrating another example of a configuration of an HSI PHY header for variable length header information protection according to exemplary embodiments. In FIG. 9, a method using the frame length field or the field of a number of subheaders described in FIG. 7 may be applied in a configuration of the HSI PHY header, and thus detailed descriptions thereof will be omitted.

Descriptions of identical fields to those of FIG. 6, from each field of an HSI PHY header 910 of FIG. 9, will be omitted.

Figure 10:
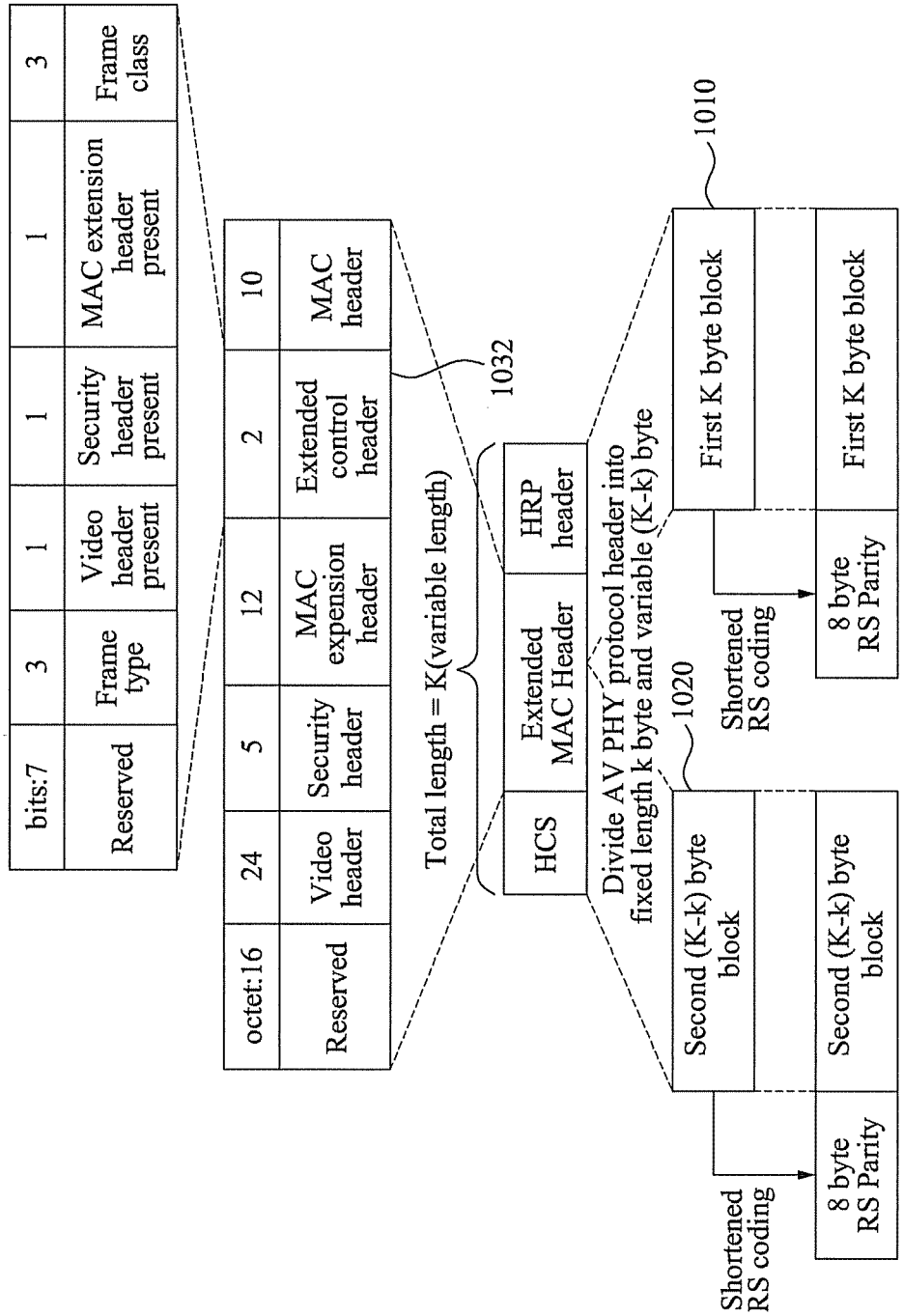
FIG. 10 is a diagram illustrating an example of a configuration of a protocol header for variable length header information protection according to exemplary embodiments.

FIG. 10 is a diagram illustrating an example of a configuration of a protocol header for variable length header information protection according to exemplary embodiments. Referring to FIG. 10, a protocol header in an Audio/Visual (AV) PHY may include an HRP header, a High rate protocol (HRP) header, an extended MAC header, and an HCS, and a total length K of the protocol header may be expressed as $$K = L_{HRP\_header} + L_{MAC\_header} + L_{Extended\_control\_header} + I_{MAC\_extension\_header} \times L_{MAC\_extension\_header} + I_{security\_header} \times L_{security\_header} + I_{video\_header} \times L_{video\_header} + L_{reserved} + L_{HCS},$$ [Equation 1]

wherein $L_{HRP\_header}$ denotes a length of an HRP header, $L_{MAC\_header}$ denotes a length of an MAC header, $L_{Extended\_control\_header}$ denotes a length of an extended control header, $I_{MAC\_extension\_header}$ denotes a value of an MAC extension header present bit, $I_{security\_header}$ denotes a value of a security header present bit of the extended control header, $I_{video\_header}$ denotes a value of a video header present bit of the extended control header, $L_{MAC\_extension\_header}$ denotes a length of an MAC extension header, $L_{security\_header}$ denotes a length of a security header, $L_{video\_header}$ denotes a length of a video header, $L_{reserved}$ denotes a length of a reserved field, and $L_{HCS}$ denotes a length of an HCS. In this instance, a field length expressed as 'L' may be a fixed length, however, a total length K may be a variable length according to a bit value expressed as 'I'.

According to exemplary embodiments, an AV PHY protocol header configured of K bytes may be divided into a fixed length k byte and a variable length (K−k) byte, and the divided information blocks may be individually encoded using the shortened RS code. In this instance, a value of the fixed length k byte may satisfy Equation 2 below, which is expressed as $$k \geq L_{HRP\_header} + L_{MAC\_header} + L_{Extended\_control\_header}.$$ [Equation 2]

In Equation 2, as a condition of a value of k, an extended control header 1032 is required to be included in a fixed length information block 1010. The extended control header 1032 may include length information of a (K−k) variable length information block 1020.

Figure 11:
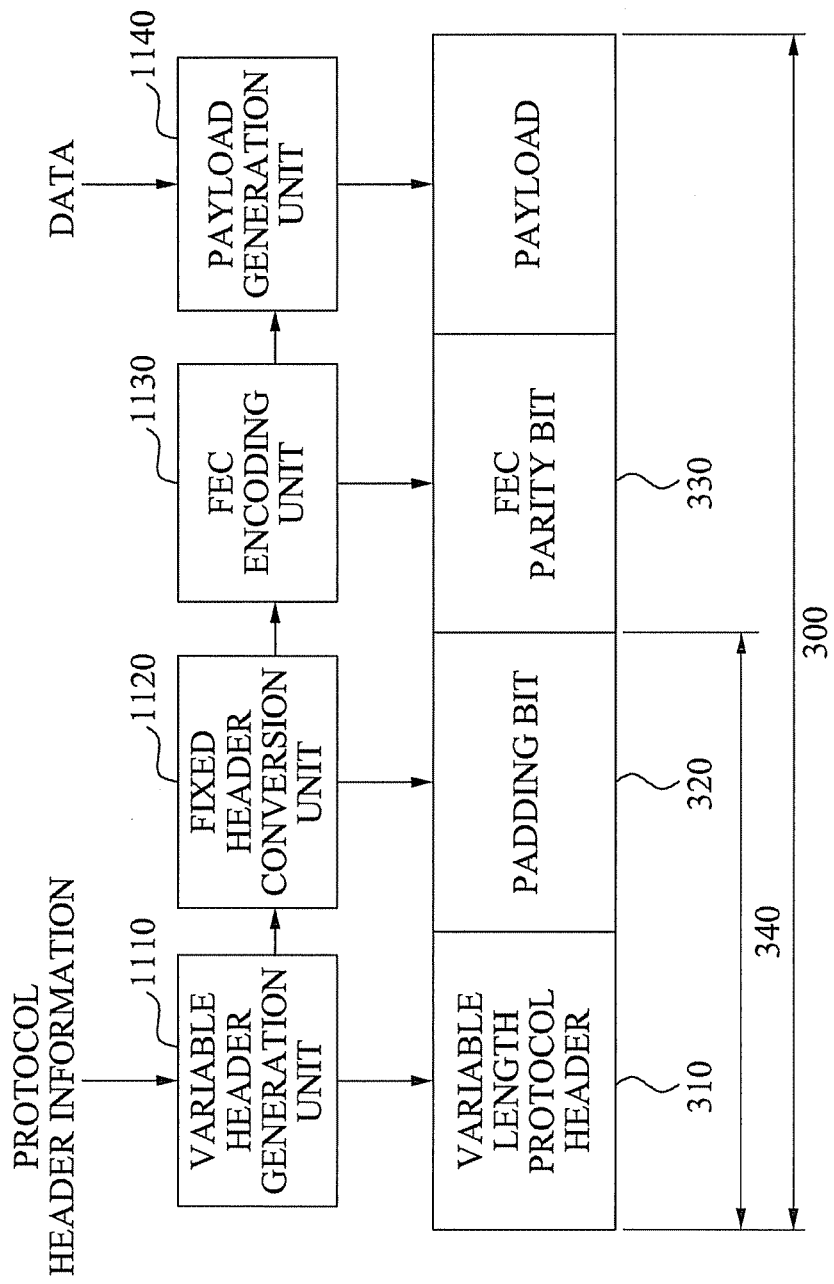
FIG. 11 is a diagram illustrating an example of a configuration of an apparatus for generating a frame including a variable length header according to exemplary embodiments.

FIG. 11 is a diagram illustrating an example of a configuration of an apparatus for generating a frame including a variable length header according to exemplary embodiments. Referring to FIG. 11, the apparatus for generating the frame according to exemplary embodiments may be an apparatus for generating the frame of FIG. 3, and may include a variable header generation unit 1110, a fixed header conversion unit 1120, a Forward Error Correction (FEC) encoding unit 1130, and a payload generation unit 1140.

The variable header generation unit 1110 may generate a variable length protocol header 310 by receiving protocol header information. The fixed header conversion unit may convert the variable length protocol header 310 into a fixed length protocol header 340 having a predetermined fixed length by adding padding bits 320, having a value of '0', to the variable length protocol header 310, and to insert the converted protocol header in a frame 300.

The FEC encoding unit 1130 may FEC-encode the fixed length protocol header 340 including the padding bits 320 to generate an FEC parity bit 330, and to insert the FEC parity bit 330 in the frame 300. The payload generation unit 1140 may generate a payload including received data.

Figure 12:
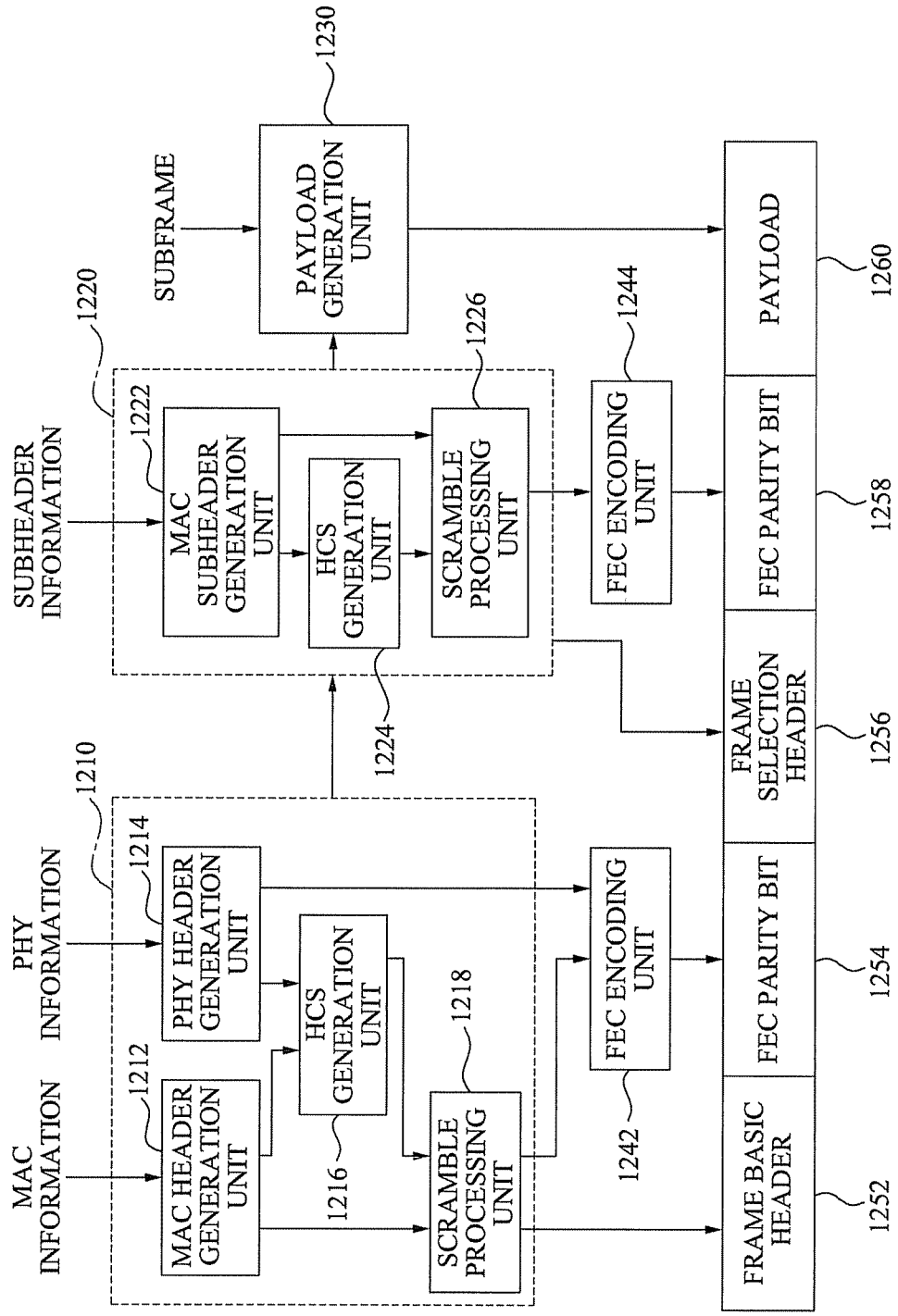
FIG. 12 is a diagram illustrating an example of a configuration of an apparatus for generating a frame including a variable length selection header according to exemplary embodiments.

FIG. 12 is a diagram illustrating an example of a configuration of an apparatus for generating a frame including a variable length selection header according to exemplary embodiments. Referring to FIG. 12, the apparatus for generating the frame according to exemplary embodiments may be an apparatus for generating the frame of FIG. 4 or 5, and may include a frame basic header generation unit 1210, a frame selection header generation unit 1220, a payload generation unit 1230, an FEC encoding unit 1242, and an FEC encoding unit 1244.

The frame basic header generation unit 1210 may generate a basic header 1252 of a frame including a PHY header, an MAC header, and a first HCS. The frame basic header generation unit 1210 may include an MAC header generation unit 1212, a PHY header generation unit 1214, an HCS generation unit 1216, and a scramble processing unit 1218.

The MAC header generation unit 1212 may receive MAC information to generate an MAC header. The PHY header generation unit 1214 may receive PHY information to generate a PHY header. The HCS generation unit 1216 may generate an HCS for error detection of the PHY header and the MAC header. The scramble processing unit 1218 may scramble the MAC header and the HCS. The basic header 1252 may include the PHY header, the scrambled MAC header, and the scrambled HCS.

The frame selection header generation unit 1220 may generate a selection header of a frame including a fixed length MAC subheader and HCS. The frame selection header generation unit 1220 may include an MAC subheader generation unit 1222, an HCS generation unit 1224, and a scramble processing unit 1226.

The MAC subheader generation unit 1222 may generate a fixed length MAC subheader by adding a padding subheader to subheaders when receiving the subheaders. In this instance, the padding subheader may designate a subheader in which a value of length information of a corresponding subframe is zero. The HCS generation unit 1224 may generate an HCS for error detection of the MAC subheader. The scramble processing unit 1226 may scramble the fixed length MAC subheader and HCS to generate a selection header 1256.

The FEC encoding unit 1242 may FEC-encode the basic header 1252 to generate an FEC parity bit 1254 of the basic header. The FEC encoding unit 1244 may FEC-encode the selection header 1256 to generate an FEC parity bit 1258 of the basic header.

The FEC encoding applied in the FEC encoding unit 1242 and the FEC encoding unit 1244 may be an RS encoding or LDPC encoding. The payload generation unit 1230 may receive subframes to generate a payload 1260 including an aggregated subframe.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A frame generation apparatus, comprising:
   a frame basic header generation unit to generate a basic header of a frame including a physical layer protocol (PHY) header, a Media Access Control (MAC) header, and a first Header Check Sequence (HCS); and
   a frame selection header generation unit to generate a selection header of the frame including a fixed length MAC subheader and a second HCS,
   wherein the fixed length MAC subheader is generated using a padding subheader,
   wherein the padding subheader is a subheader in which a length information value of a corresponding subframe is '0'.

2. The frame generation apparatus of claim 1, wherein the frame selection header generation unit includes:
   an MAC subheader generation unit to generate the fixed length MAC subheader by adding a padding subheader to subheaders when receiving the subheaders; and
   an HCS generation unit to generate the second HCS for error detection of the MAC subheader.

3. The frame generation apparatus of claim 2, further comprising:
   a scramble processing unit to scramble the fixed length MAC subheader and the second HCS to generate the selection header.

4. The frame generation apparatus of claim 1, wherein the frame basic header generation unit includes:
   a PHY header generation unit to generate the PHY header by receiving PHY information;
   an MAC header generation unit to generate the MAC header by receiving MAC information;
   an HCS generation unit to generate the first HCS for error detection of the PHY header and the MAC header; and
   a scramble processing unit to scramble the MAC header and the first HCS.

5. The frame generation apparatus of claim 1, further comprising:
   a Forward Error Correction (FEC) encoding unit to FEC-encode each of the basic header and the selection header to generate respective FEC parity bits.

6. The frame generation apparatus of claim 5, wherein the FEC encoding is a Reed-Solomon (RS) encoding or a Low Density Parity Check (LDPC) encoding.

7. The frame generation apparatus of claim 1, wherein the frame includes a payload including the basic header, the FEC parity bit of the basic header, the selection header, the FEC parity bit of the selection header, and an aggregated subframe.

8. A frame generation method, comprising:
   generating a basic header of a frame including a PHY header, an MAC header, and a first HCS; and
   generating a selection header of the frame including a fixed length MAC subheader and a second HCS,
   wherein the generating of the selection header includes:
   generating the fixed length MAC subheader by adding a padding subheader to subheaders when receiving the subheaders; and
   generating the second HCS for error detection of the MAC subheader,
   wherein the padding subheader is a subheader in which a length information value of a corresponding sub-frame is '0'.

9. The frame generation method of claim 8, further comprising: generating the selection header by scrambling the fixed length MAC subheader and the second HCS.

10. The frame generation method of claim 8, wherein the generating of the basic header includes:
    generating the PHY header by receiving PHY information;
    generating the MAC header by receiving MAC information;
    generating the first HCS for error detection of the PHY header and the MAC header;
    scrambling the MAC header and the first HCS; and
    generating the basic header including the PHY header, the scrambled MAC header, and the scrambled first HCS.

11. The frame generation method of claim 8, further comprising:
    FEC-encoding each of the basic header and the selection header to generate respective FEC parity bits.

12. The frame generation method of claim 11, wherein the FEC encoding is one of an RS encoding or an LDPC encoding.

13. The frame generation method of claim 8, wherein the frame includes a payload including the basic header, an FEC parity bit of the basic header, the selection header, an FEC parity bit of the selection header, and an aggregated subframe.

* * * * *